US012708854B2

(12) United States Patent
Justman

(10) Patent No.: US 12,708,854 B2
(45) Date of Patent: Aug. 18, 2026

(54) PASSPORT SYSTEM AND METHOD FOR ENABLING INTEROPERABLE SETTINGS FOR INTERACTIVE ONLINE PLATFORMS

(71) Applicant: Sony Interactive Entertainment LLC, San Mateo, CA (US)

(72) Inventor: Anthony Justman, San Mateo, CA (US)

(73) Assignee: Sony Interactive Entertainment LLC

( * ) Notice: Subject to any disclaimer, the term of this patent is extended or adjusted under 35 U.S.C. 154(b) by 299 days.

(21) Appl. No.: 18/336,365

(22) Filed: Jun. 16, 2023

(65) Prior Publication Data

US 2024/0416246 A1 Dec. 19, 2024

(51) Int. Cl.

*A63F 13/73* (2014.01)
*A63F 13/79* (2014.01)
*G06F 21/62* (2013.01)

(52) U.S. Cl.

CPC .............. *A63F 13/73* (2014.09); *A63F 13/79* (2014.09); *G06F 21/6245* (2013.01)

(58) Field of Classification Search

None

See application file for complete search history.

(56) References Cited

U.S. PATENT DOCUMENTS 11,862,304 B1 * 1/2024 Klein .................... G16H 40/67
2002/0142825 A1 * 10/2002 Lark .................... G06Q 20/382 463/16
2006/0121991 A1 * 6/2006 Borinik .................. A63F 13/12 463/43
2012/0109882 A1 * 5/2012 Bouse .................... G06Q 10/10 707/E17.107
2015/0128294 A1 * 5/2015 Noguchi ................. H04L 67/02 726/29
2021/0058402 A1 * 2/2021 Onyekwelu ........... H04L 63/105
2023/0173395 A1 * 6/2023 Cella ...................... G06Q 30/06 463/25
2023/0233937 A1 * 7/2023 Takubo ................... A63F 13/69 463/31
2024/0316465 A1 * 9/2024 Silverstein ............. A63F 13/79

OTHER PUBLICATIONS

"Interoperability in the Metaverse: Briefing Paper", World Economic Forum, Jan. 2023. Retreived from https://www3.weforum.org/docs/WEF_Interoperability_in_the_Metaverse.pdf.

"International Search Report and Written Opinion", dated Oct. 16, 2024, from the counterpart PCT application PCT/US24/31639.

* cited by examiner

*Primary Examiner* — Jason T Yen

(74) *Attorney, Agent, or Firm* — Kilpatrick Townsend & Stockton LLP

(57) ABSTRACT

A user's settings including privacy settings in a computer game system are recorded in a digital passport and mapped to settings in third party interactive online services to seamlessly achieve the same level of privacy protection and other personal settings throughout other interactive online services as the user has already established in a computer game account. Any exceptions to establishing the passport settings can be surfaced so the user can decide whether to proceed with engagement of a third party interactive online service.

20 Claims, 7 Drawing Sheets

PASSPORT SYSTEM AND METHOD FOR ENABLING INTEROPERABLE SETTINGS FOR INTERACTIVE ONLINE PLATFORMS

FIELD

The present application relates generally to passport systems and methods for enabling interoperable settings for interactive online platforms.

BACKGROUND

Computer network users typically have many accounts across interactive online services requiring entry of various user-based settings.

SUMMARY

As understood herein, entering a number of settings into each and every interactive online service a user seeks to access is tedious and time consuming, and, furthermore, can lead to errors. As also understood herein, computer game players who use an interactive online service typically have accounts that include settings that are stored, among other places, in a computer game system. These players are likely to be early adopters of new interactive online services.

Accordingly, a system includes at least one computer medium that is not a transitory signal and that in turn includes instructions executable by at least one processor to access account settings of a first user and stored in a computer game system. The instructions are executable to identify at least one third-party interactive online service (3PIOS), and map the account settings of the first user from the computer game system to the 3PIOS.

In example implementations, the instructions can be executable to map the account settings to the 3PIOS at least in part by generating a mapping between the account settings of the first user in the computer game system and available settings in the 3PIOS. Further, the instructions may be executable to present a user-perceptible indication of at least one exception, specifically an unavailable counterpart setting in the 3PIOS to a first setting in the account settings of the first user in the computer game system. An example may be a content filter.

In addition or alternatively, the instructions can be executable to present a user-perceptible indication of at least one exception, specifically at least one refusal of the 3PIOS to establish at least a first setting in the account settings of the first user in the computer game system. An example may be a privacy setting.

In another aspect, an apparatus includes at least one processor configured to map computer game platform settings including user specific privacy/game settings through a passport comprising platform assets, and provide the passport to a 3PIOS to conform operation of the 3PIOS to the passport assets.

In some implementations of this aspect, the platform assets include any one or more of at least one privacy setting, at least one content filter, at least one account linking asset, at least one asset related to subrogation of minors, and at least one identification document.

In example embodiments of this aspect, the processor may be configured to surface exceptions to the passport assets in the 3PIOS and present one or more user choices selectable during initial engagement by a user associated with the passport to accept or deny the exceptions or to enter alternative configurations.

In some examples the processor is configured to surface non-overlap of passport assets in the 3PIOS and create a mapping template between the passport assets and settings in the 3PIOS. If desired, the processor may be configured to add to the passport at least one setting based on at least one trend in global policy settings.

In some examples, at least some passport settings are implemented in a blockchain defining rights and responsibilities pertaining to modifying at least one of the passport assets. For example, the passport assets may include a non-fungible token (NFT).

In another aspect, a method includes identifying a mapping of user-established assets related to a computer game system to counterpart assets of at least one 3PIOS, and providing the mapping to the 3PIOS to configure the 3PIOS in accordance with the user-established assets related to the computer game system.

In some embodiments the method may include presenting an indication of at least one user-established asset related to the computer game system that is not satisfied by the 3PIOS. If desired, the user-established assets related to the computer game system include at least one privacy setting and at least one content filter.

The details of the present application, both as to its structure and operation, can be best understood in reference to the accompanying drawings, in which like reference numerals refer to like parts, and in which:

DETAILED DESCRIPTION

Figure 1:
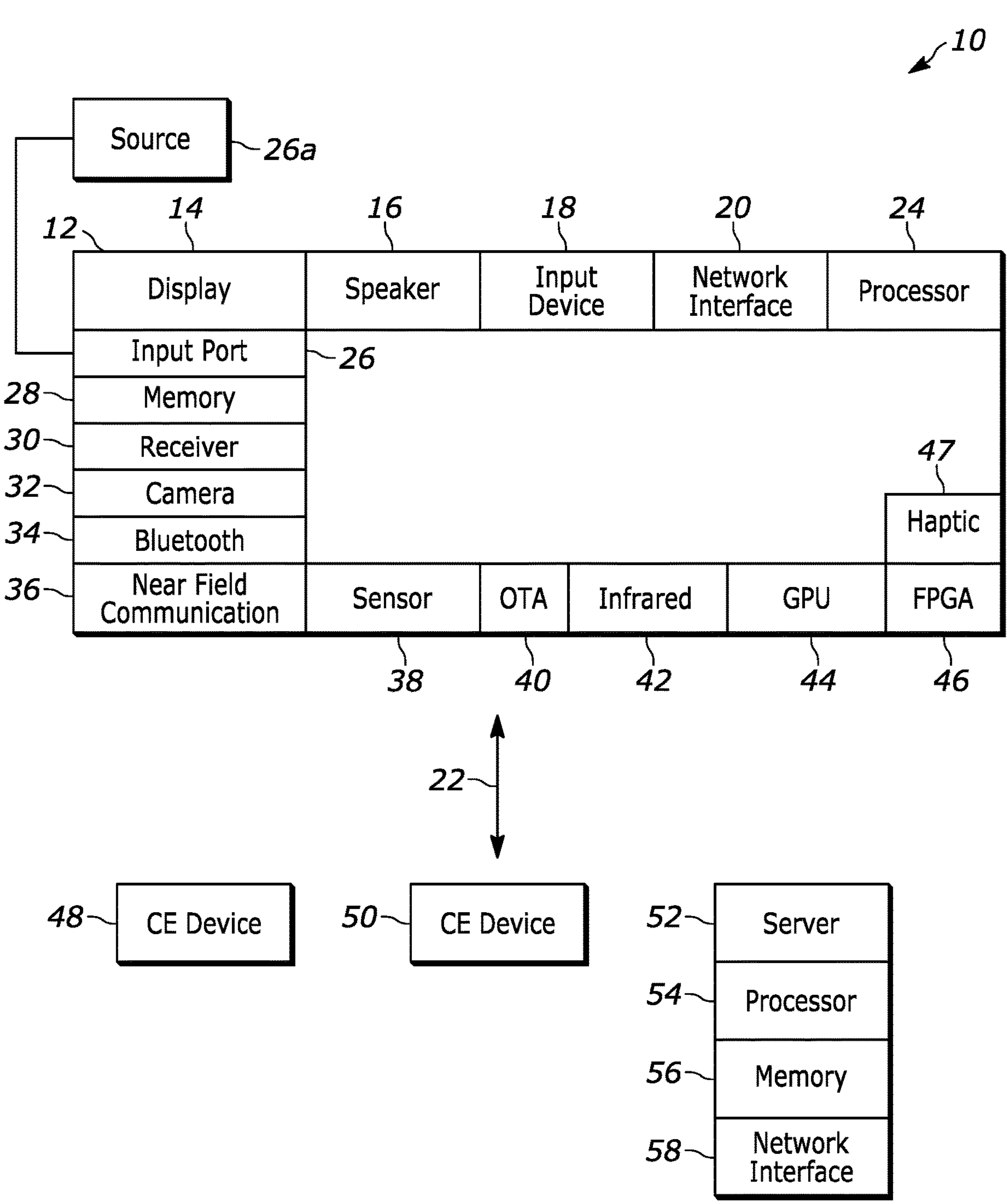
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, or another device capable of running interactive online experiences.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a*, when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
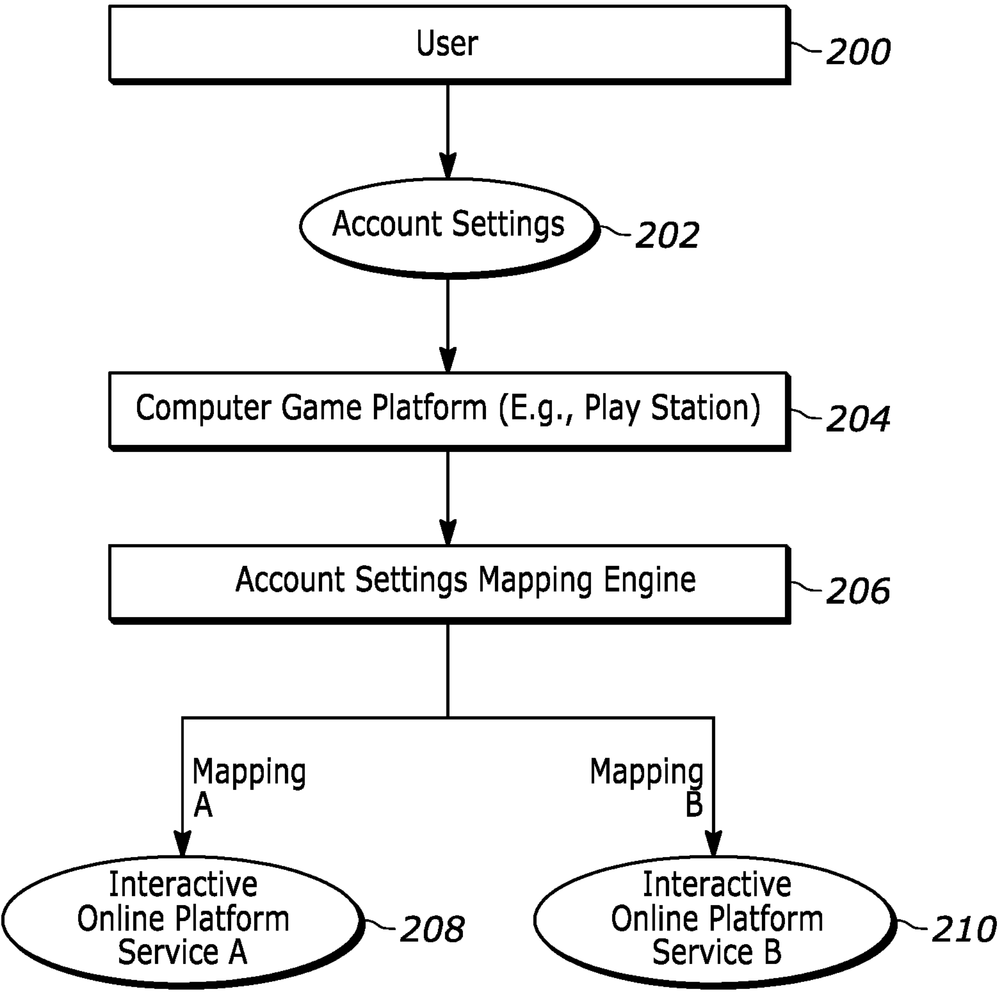
FIG. 2 is an architecture block diagram.

FIG. 2 illustrates an overall example architecture. A person 200 may establish account settings 202 in a computer game platform 204. The computer game platform may be, for example, a Sony PlayStation game system. The platform 204 can access an account settings mapping engine 206 that operates according to principles herein to provide account setting mappings via what can be thought of as a digital passport to plural third party interactive online services (3PIOS) to establish as much of the platform account settings 202 as possible in the respective 3PIOS automatically without further interaction from the person 200. In the example shown, a first game platform-to-interactive online service account setting mapping is provided to a first 3PIOS 208 while a second and potentially different game platform-to-interactive online service account setting mapping is provided to a second 3PIOS 210. It will readily be appreciated that present principles recognize that not all account settings provided for by the game platform 204 may be supported by a 3PIOS, hence the mapping techniques divulged herein.

Account settings may include a large number of parameters. In other words, the digital passport may contain a large number of assets or entitlements. For example, account settings may include account settings per se such as usernames, passwords, addresses, etc. as well as privacy settings, parental controls, identification documents, content filters, linked accounts, etc.

The sample account settings mapping below provides an example illustration, in which passport assets, defined by account settings in the game platform, are mapped to available 3PIOS assets.

Mapping for Example 3PIOS

| | 3PIOS Asset |
|---|---|
| Passport Asset One | |
| account setting one | same |
| . | . |
| . | . |
| account setting N | same |
| Passport Asset Two | |
| privacy setting one | same |
| privacy setting two (username only) | username plus email required |
| Passport Asset Three | |
| content filter one (under 12 only) | under 18 only |

-continued

Mapping for Example 3PIOS

| | 3PIOS Asset |
|---|---|
| Passport Asset Four | |
| link friend accounts only | same |
| Passport Asset Five | |
| trend global MV setting | does not support |
| Passport Asset Six | |
| child sub on | same |
| Passport Asset Seven | |
| NFT | honors blockchain conditions |

Figure 3:
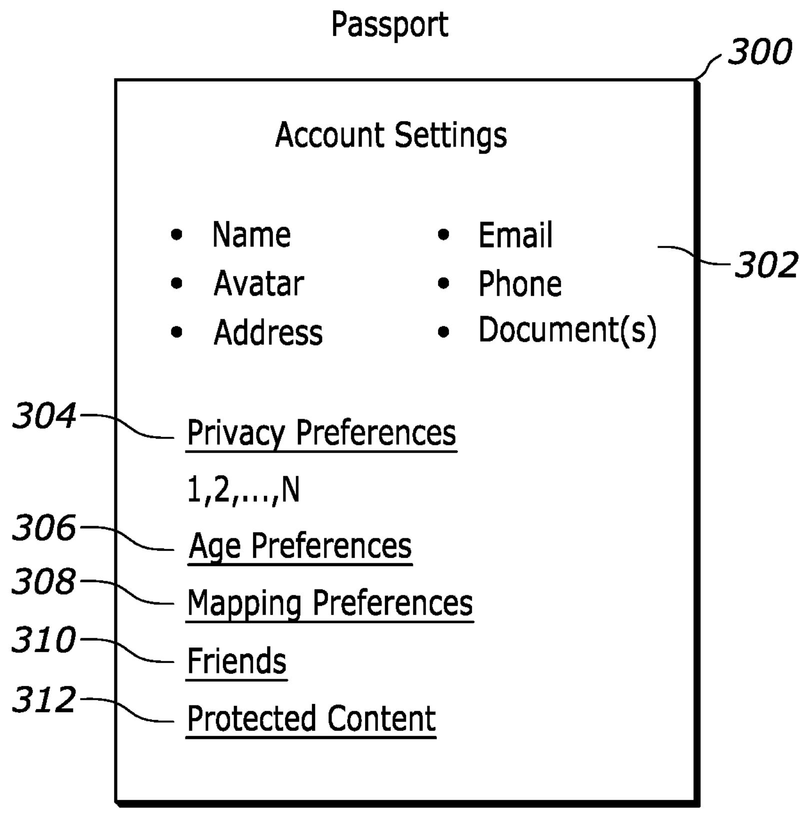
FIG. 3 illustrates example digital passport settings.

For further illustration, refer to FIG. 3, which illustrates a digital passport 300. The passport 300 includes user-centric settings 302 such as name, email, avatar, phone number, physical and/or network addresses, and identification documents. For example, the documents may include a driver's license that can be used as an age credential to a 3PIOS.

The passport 300 also includes privacy preference 304 such as "reveal my username only, and no other personal information", etc. The passport 300 may also contain age-preferred content filters 306 such as "show this account only videos rated for 18 and under".

Moreover, the passport 300 may include mapping preferences 308 such as "do not establish a 3PIOS account unless all my game platform settings are accepted by the 3PIOS", "advise me if a 3PIOS cannot satisfy any game platform setting", "accede to a demand from a 3PIOS to divulge my real name despite my privacy setting otherwise, but accede to no other demands", etc. Thus, the user can tailor his or her mappings to gain access to a 3PIOS despite passport assets that would otherwise prevent such access.

A friends asset 310 also may be provided to aid in establishing a setting, for instance a privacy setting, that permits sharing of data with friends only.

Passport assets can also include protected content 312, such as copyrightable material protected as a non-fungible token (NFT) and other blockchain assets.

Figure 4:
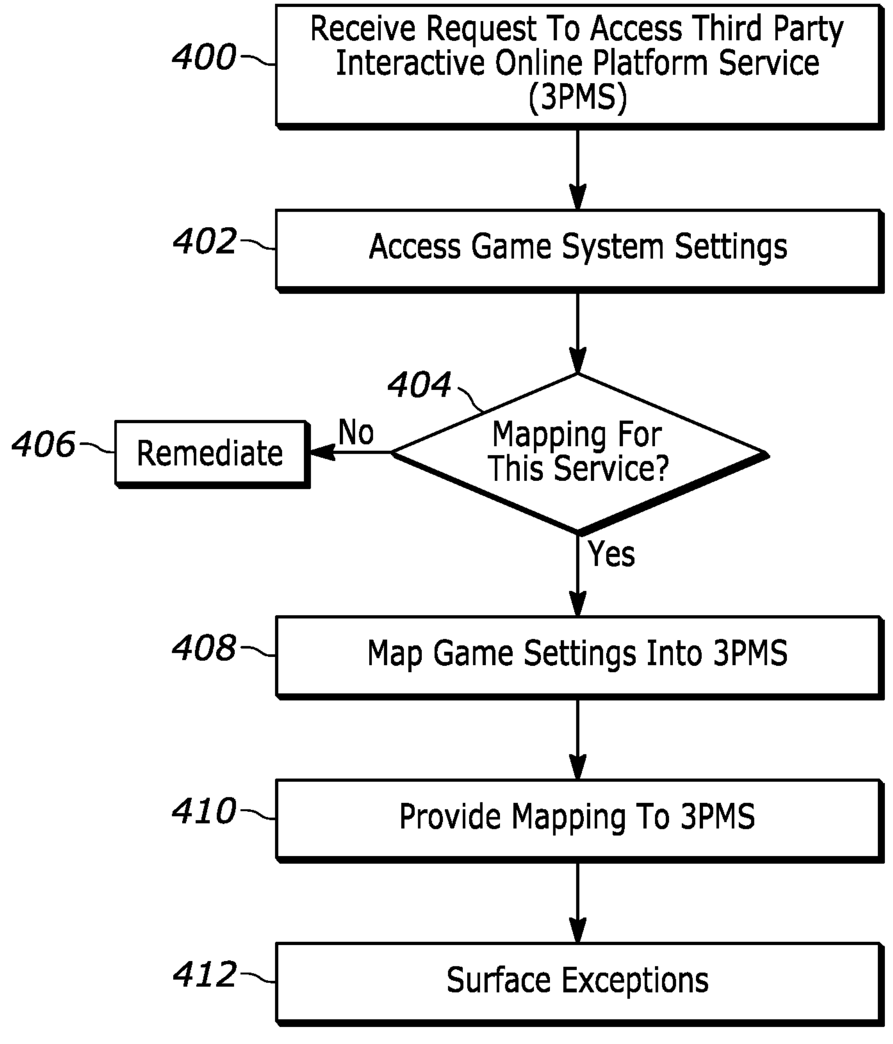
FIG. 4 illustrates example overall logic in example flow chart format.

Turn now to FIG. 4 for disclosure of surfacing exceptions in a 3PIOS to game platform settings such as user choices that don't naturally map from A so user can make those selections during initial engagement in third party service using passport assets.

FIG. 4 illustrates general techniques consistent with present principles. At block 400, a request is received, e.g., at a game console, to access a 3PIOS. In response, the logic moves to block 402 to access the game platform settings. Moving to decision diamond 404, it is determined whether a game platform-to-3PIOS setting mapping exists for the requested 3PIOS. If not, remediation is executed at block 406 as discussed further below.

On the other hand, if a mapping for the requested 3PIOS exists, the logic moves to block 408 to map the game platform settings into the 3PIOS according to the mapping. The mapping is provided to the 3PIOS at block 410 for implementation of the settings by the 3PIOS. Any exceptions to conforming to the user's mapped game platform settings are surfaced at block 412.

Figure 5:
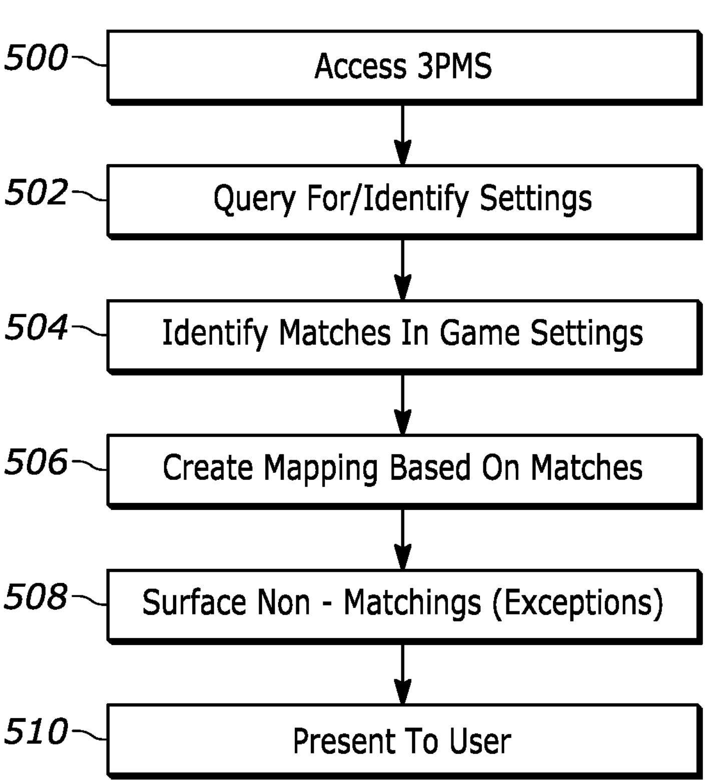
FIG. 5 illustrates example remediation logic in example flow chart format.

FIG. 5 illustrates an example remediation that can be executed at block 406 in FIG. 4. Commencing at block 500 in FIG. 5, the 3PIOS is accessed by, for instance, an expert person associated with the game platform or by a computerized bot. Moving to block 502, the 3PIOS is queried for or otherwise accessed for its required account setting inputs. In other words, at block 502 an automated bot or human user accesses the 3PIOS and attempts to establish an account, determining what settings are required, which are optional, and in general all settings available for a user to input.

Any matches between the settings provided by the 3PIOS and the passport assets from the game platform are identified at block 504. Then at block 506 a mapping is created on the basis of the outcome of block 504.

Moving to block 508, any non-matches of passport assets from the game platform with respect to the 3PIOS accessed at block 508 are identified and surfaced for presentation at block 510 in human-intelligible form, whether visually on a display, audibly on a microphone, or tactilely.

Figure 6:
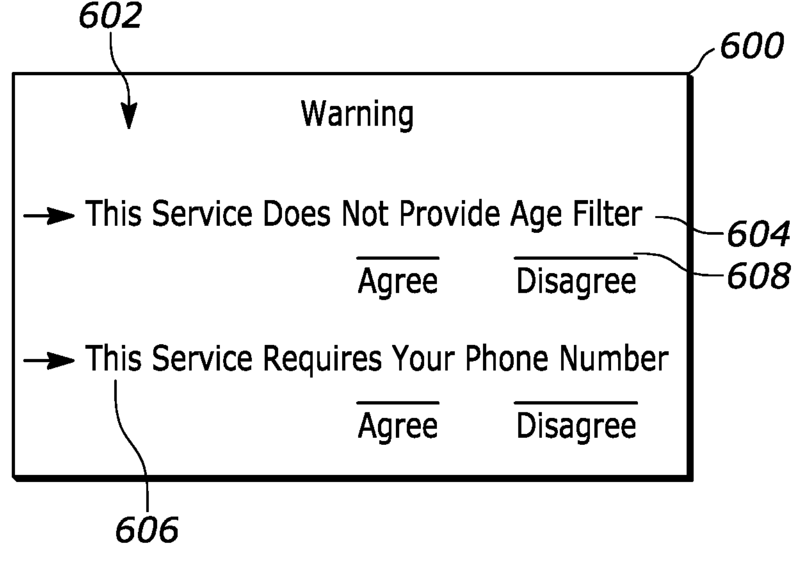
FIG. 6 illustrates an example user interface (UI) illustrating the surfacing of exceptions.

FIG. 6 illustrates this further. For disclosure purposes, assume that a user's passports assets from the game platform require content presented to the user be suitable for filter for 18 and under (an example content filter), and that the user has a privacy setting to conceal the user's phone number (an example privacy setting).

A display 600 such as any display divulged herein can be used to present a user interface (UI) 602 with an advisory for each exception. In the example shown, a first advisory 604 is presented indicating that the 3PIOS does not provide for an age filter as otherwise indicated in the game platform passport assets for the user. A second advisory 606 is provided indicating that, contrary to the game platform settings to conceal the user's phone number, the 3PIOS requires the phone number for access. Selectors 608 may be provided to enable the user to acquiesce or not to each or all of the exceptions.

Figure 7:
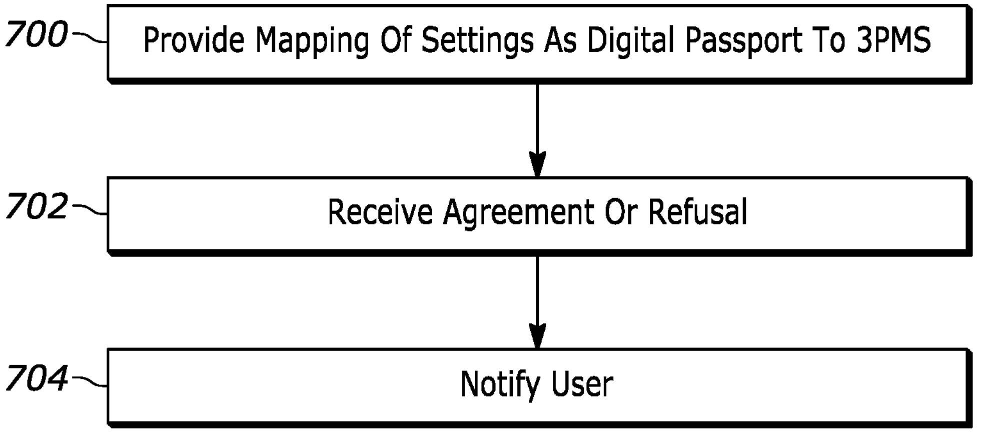
FIG. 7 illustrates example logic for providing and establishing settings in a third party Metaverse service (3PIOS) in example flow chart format.
Figure 8:
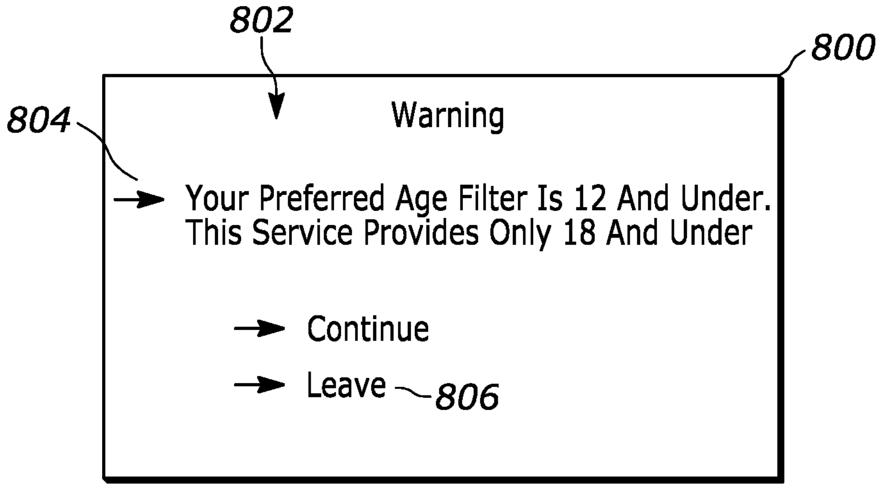
FIG. 8 illustrates another example UI illustrating the surfacing of exceptions.

FIGS. 7 and 8 provide techniques for handling use cases in which a 3PIOS may refuse to implement a passport asset (setting from the game platform) or may be able to only partially implement it. Commencing at block 700 in FIG. 7 the mapping described above is sent to a 3PIOS sought to be accessed and agreement or refusal to implement the game platform settings at the 3PIOS is received back at block 702. The user is notified of such at block 704.

In FIG. 8, a display 800 such as any display divulged herein can be used to present a UI 802 with an advisory 804 that a 3PIOS can only partially implement a user's setting from the game platform. In the example shown, the game platform setting is a content filter that permits presenting only games and other content suitable for twelve years old and under. The 3PIOS of this example can offer only a filter that permits presenting only games and other content suitable for eighteen years old and under. Selectors 806 are provided to enable the user (perhaps a parent in this case) to accept the 3PIOS setting or not. If accepted, this acceptance is added to the mapping for that 3PIOS.

Figure 9:
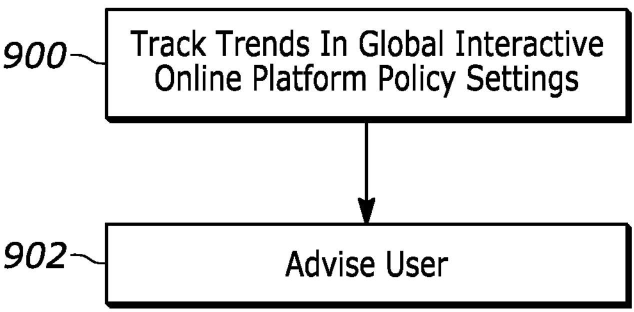
FIG. 9 illustrates example logic for global Metaverse settings in example flow chart format.

FIG. 9 illustrates that trends across 3PIOS in the Metaverse in various policy settings may be observed at block 900. The trends can be presented to the user at block 902 to enable the user to decide whether to adopt the trends or not.

Figure 10:
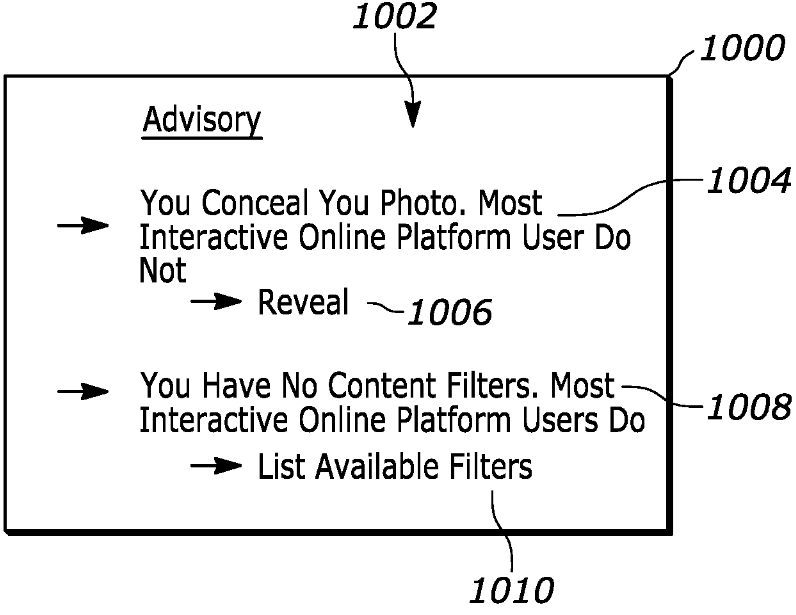
FIG. 10 illustrates an example UI related to global Metaverse settings.

FIG. 10 illustrates. A display 1000 such as any display divulged herein can be used to present a UI 1002 with an advisory 1004 that the user in this example has a privacy setting in the user's game platform to conceal the user's photo, but that most other Metaverse users do not have such a restriction. A selector 1006 may be presented to allow the user to change the game platform's provided privacy setting to 3PIOS to conform to the global trend.

A second advisory 1008 is provided to the user that the user's passport assets do not include content filters, whereas most Metaverse users employ one or more content filters. A selector 1010 may be provided to enable the user to view the most popular content filters among Metaverse users for adoption of one or more of them by the user.

While the particular embodiments are herein shown and described in detail, it is to be understood that the subject matter which is encompassed by the present invention is limited only by the claims.

What is claimed is:

1. A system comprising:

at least one computer medium that is not a transitory signal and that comprises instructions executable by at least one processor to:

identify a mapping of at least one user-established preference related to a computer game system to a corresponding configuration of at least one external online platform;

determine, for the at least one user-established preference to be mapped to at least one external online system, a default or commonly selected configuration for that preference on the at least one external online system;

apply a user selection to configure the at least one external online system, the user selection indicating an acceptance, modification, or rejection of a recommendation to select the configuration; and provide the mapping to the at least one external online platform to configure the at least one external online platform in accordance with the at least one user-established preference related to the computer game system.

2. The system of claim 1, wherein the instructions are executable to:

map the at least one user-established preferences to the corresponding configuration of the at least one external online platform at least in part by generating a mapping between account settings of a first user in the computer game system and available settings in the at least one external online platform.

3. The system of claim 1, wherein the instructions are executable to:

present an indication of the at least one user-established preference related to the computer game system that is not satisfied by the at least one external online platform.

4. The system of claim 1, wherein the instructions are executable to:

identify, for each user-established preference mapped to a corresponding configuration of the at least one external online platform, whether the corresponding configuration is unsupported or refused by the external online platform;

present one or more selectable user choices to accept, deny, or select an alternative configuration for the at least one external online platform in response to the unsupported or refused configuration; and modify the mapping provided to the at least one external online platform based on any accepted, denied, or alternative configuration selected.

5. The system of claim 3, wherein the at least one user-established preference comprises a content filter.

6. The system of claim 4, wherein the at least one user-established preference comprises a privacy setting.

7. An apparatus, comprising:

at least one processor configured to:

identify a mapping of at least one user-established preference related to a computer game system to corresponding configuration of at least one external online platform;

determine, for the at least one user-established preference to be mapped to at least one external online system, a default or commonly selected configuration for that preference on the at least one external online system;

apply a user selection to configure the at least one external online system, the user selection indicating an acceptance, modification, or rejection of a recommendation to select the configuration; and provide the mapping to the at least one external online platform to configure the at least one external online platform in accordance with the at least one user-established preference related to the computer game system.

8. The apparatus of claim 7, wherein the at least one user-established preference comprises at least one privacy setting.

9. The apparatus of claim 7, wherein the at least one user-established preference comprises at least one content filter.

10. The apparatus of claim 7, wherein the at least one user-established preference comprises at least one account linking asset.

11. The apparatus of claim 7, wherein the at least one user-established preference comprises at least controlling access based on user age.

12. The apparatus of claim 7, wherein the processor is configured to:

identify, for each user-established preference mapped to a corresponding configuration of the at least one external online platform, whether the corresponding configuration is unsupported or refused by the external online platform;

present one or more selectable user choices to accept, deny, or select an alternative configuration for the at least one external online platform in response to the unsupported or refused configuration; and modify the mapping provided to the at least one external online platform based on any accepted, denied, or alternative configuration selected.

13. The apparatus of claim 7, wherein the processor is configured to:

identify, for each of the at least one external online platform, at least one configuration for which there is no corresponding user-established preference;

receive a user selection indicating the user-established preference; and create a mapping between the user-established preference and the at least one configuration.

14. The apparatus of claim 7, wherein the processor is configured to:

identify at least one external online platform configuration trend; and suggest at least one external online platform configuration based on the at least one external online platform configuration trend.

15. The apparatus of claim 7, wherein the at least one user-established preference comprises at least one identification document.

16. The apparatus of claim 7, wherein at least some mapping data related to the mapping of at least one user-established preference is implemented in a blockchain, the blockchain defining rights and responsibilities pertaining to modifying the at least one external online platform configuration.

17. A method, comprising:

identifying a mapping of at least one user-established preference related to a computer game system to a corresponding configuration of at least one external online platform;

determining, for the at least one user-established preference to be mapped to at least one external online system, a default or commonly selected configuration for that preference on the at least one external online system;

applying a user selection to configure the at least one external online system, the user selection indicating an acceptance, modification, or rejection of a recommendation to select the configuration; and providing the mapping to the at least one external online platform to configure at least one external online platform in accordance with the at least one user-established preference related to the computer game system.

18. The method of claim 17, comprising presenting an indication of the at least one user-established preference related to the computer game system that is not satisfied by the at least one external online platform.

19. The method of claim 17, wherein the at least one user-established preference related to the computer game system comprises at least one privacy setting and at least one content filter.

20. The method of claim 17, further comprising:

presenting, via a user interface, the recommendation to select the default or commonly selected configuration for the preference;

and applying the user selection to configure the at least one external online platform.

* * * * *